United States Patent
Håkansson et al.

(10) Patent No.: US 11,837,943 B2
(45) Date of Patent: Dec. 5, 2023

(54) ROTOR AIR COOLING SYSTEM

(71) Applicant: Volvo Car Corporation, Gothenburg (SE)

(72) Inventors: Emil Håkansson, Gothenburg (SE); Johan Brunberg, Molndal (SE); Johan Andersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 154 days.

(21) Appl. No.: 17/103,200

(22) Filed: Nov. 24, 2020

(65) Prior Publication Data
US 2021/0194324 A1 Jun. 24, 2021

(30) Foreign Application Priority Data
Dec. 20, 2019 (EP) .................................. 19218519

(51) Int. Cl.
*H02K 5/20* (2006.01)
*H02K 9/06* (2006.01)
*H02K 1/32* (2006.01)

(52) U.S. Cl.
CPC .............. *H02K 9/06* (2013.01); *H02K 1/32* (2013.01); *H02K 5/20* (2013.01)

(58) Field of Classification Search
CPC .. H02K 9/06; H02K 9/04; H02K 9/10; H02K 1/32; H02K 1/20; H02K 5/20; H02K 5/203; H02K 9/19; H02K 2209/00
USPC ...................................... 310/60 R, 61, 54, 58
See application file for complete search history.

(56) References Cited

U.S. PATENT DOCUMENTS

| | | | |
|---|---|---|---|
| 4,296,648 | A | 10/1981 | Okano et al. |
| 4,531,357 | A | 7/1985 | Weber et al. |
| 5,866,959 | A | 2/1999 | Le Flem |
| 6,914,354 | B2 | 7/2005 | Seniawski et al. |

(Continued)

FOREIGN PATENT DOCUMENTS

| | | |
|---|---|---|
| CN | 201226471 Y | 4/2009 |
| CN | 101557143 A | 10/2009 |

(Continued)

OTHER PUBLICATIONS

May 29, 2020 European Search Report issued on International Application No. 19218519.

(Continued)

*Primary Examiner* — Michael Andrews
(74) *Attorney, Agent, or Firm* — Clements Bernard Walker; Christopher L. Bernard

(57) ABSTRACT

A rotor air cooling system including an outer housing and an inner housing configured to be inserted into the outer housing, the inner housing including an open backend. The system further includes a stator attached to an interior side of the inner housing, a main rotor body included in the inner housing, the main rotor body being arranged around a rotor shaft arranged to extend through the inner housing and the outer housing, wherein cooling air axially enters the main rotor body in an inlet end, passes through cavities of the main rotor body, and exits the main rotor body in an outlet end, and a water jacket arranged between the inner housing and the outer housing. Moreover, the system includes a heat exchanger for dissipating heat from the cooling air exiting the main rotor body.

14 Claims, 3 Drawing Sheets

(56) References Cited

U.S. PATENT DOCUMENTS

| | | | |
|---|---|---|---|
| 7,777,374 | B2 | 8/2010 | Ressel et al. |
| 8,134,260 | B2 | 3/2012 | Hassett et al. |
| 8,169,110 | B2 | 5/2012 | Swales et al. |
| 8,786,147 | B2 | 7/2014 | Kawashima et al. |
| 8,816,547 | B2 | 8/2014 | Le Besnerais |
| 9,331,552 | B2 | 5/2016 | Fedoseyev et al. |
| 2004/0000820 | A1* | 1/2004 | Cromas .............. H02K 9/12 310/58 |
| 2008/0030085 | A1 | 2/2008 | Gizaw et al. |
| 2009/0267426 | A1 | 10/2009 | Graner et al. |
| 2012/0119602 | A1* | 5/2012 | Himmelmann ...... H02K 5/203 310/54 |
| 2012/0146336 | A1* | 6/2012 | Hori .................. H02K 1/32 310/43 |
| 2013/0076168 | A1* | 3/2013 | Memminger ........ H02K 9/12 310/54 |
| 2013/0307357 | A1 | 11/2013 | Maksumic et al. |
| 2014/0175919 | A1 | 6/2014 | Miyamoto et al. |
| 2015/0381010 | A1* | 12/2015 | Kobes ................ H02K 1/04 29/598 |
| 2019/0027987 | A1 | 1/2019 | Frohlich et al. |
| 2019/0238017 | A1* | 8/2019 | Ohira ................. H02K 1/32 |
| 2019/0345956 | A1* | 11/2019 | Iizuka ............... F04D 25/0606 |

FOREIGN PATENT DOCUMENTS

| | | |
|---|---|---|
| CN | 202034857 U | 11/2011 |
| CN | 102570719 A | 7/2012 |
| CN | 202334146 U | 7/2012 |
| CN | 202872571 U | 4/2013 |
| CN | 103155365 A | 6/2013 |
| CN | 102420498 B | 7/2013 |
| CN | 103236751 A | 8/2013 |
| CN | 1045050971 A | 4/2015 |
| CN | 105071598 A | 11/2015 |
| CN | 204947807 U | 1/2016 |
| CN | 104426259 B | 7/2017 |
| DE | 102016225180 A1 | 6/2018 |
| DE | 102016225180 A1 | 8/2018 |
| DE | 102017202752 A1 | 8/2018 |
| EP | 0583301 B1 | 12/1994 |
| EP | 3022830 B1 | 5/2017 |
| JP | 2001008413 A | 1/2001 |
| KR | 987571 B1 | 6/2013 |
| KR | 1276065 B1 | 6/2013 |
| WO | 2012080566 A1 | 6/2012 |
| WO | 2017190720 A1 | 11/2017 |

OTHER PUBLICATIONS

Chang et al., The Investigation of Motor Cooling Performance, International Journal of Mechanical, Industrial and Aerospace Engineering 3:1 2009.

Koren et al., Development of air-cooling concepts for electric motor used in electric aircrafts, Conference on Modelling Fluid Flow (CMFF'18) The 17th International Conference on Fluid Flow Technologies Budapest, Hungary, Sep. 4-7, 2018.

Modern heat extraction systems for electrical machines—A review.

Jun. 16, 2023 Office action and search report issued in corresponding CN application No. 202011487208.2.

* cited by examiner

ROTOR AIR COOLING SYSTEM

CROSS-REFERENCE TO RELATED APPLICATION

The present disclosure claims the benefit of priority of co-pending European Patent Application No. 19218519.7, filed on Dec. 20, 2019, and entitled "ROTOR AIR COOLING SYSTEM," the contents of which are incorporated in full by reference herein.

TECHNICAL FIELD

The present disclosure relates to a rotor air cooling system.

BACKGROUND

In electric machines, such as electrical motors in electric or hybrid vehicles, thermal capacity of rotor magnets and stator winding affects available output power of the electric machines. The rotor magnets typically have a thermal limit of 150° C. and when temperature increases further, demagnetization occurs which reduce performance or the machine. The stator winding which consists of multiple copper wires is insulated with a material which has a temperature limit of approximately 180° C. and if the temperature increases further, thermal fatigue cracks can occur which can cause shortcuts and terminate the electric machine.

The rotor and the stator windings need to be cooled in order to improve performance of the electric machine. This cooling is commonly performed using a liquid medium such as oil of water, resulting in a more complex and expensive cooling mechanism.

SUMMARY

An objective is to solve, or at least mitigate, this problem and thus provide an improved rotor air cooling system.

This objective is attained in an aspect by a rotor air cooling system including an outer housing and an inner housing configured to be inserted into the outer housing. The system further includes a stator attached to an interior side of the inner housing, a main rotor body included in the inner housing, the main rotor body being arranged around a rotor shaft arranged to extend through the inner housing and the outer housing, wherein cooling air axially enters the main rotor body in an inlet end, passes through cavities of the main rotor body, and exits the main rotor body in an outlet end, and a water jacket arranged between the inner housing and the outer housing. Moreover, the system includes a heat exchanger for dissipating heat from the cooling air exiting the main rotor body; wherein the air exiting the main rotor body is radially guided, via an air outlet of the inner housing being aligned with an air outlet of the outer housing, through the heat exchanger before being arranged to be radially guided via an air inlet of the outer housing being aligned with an air inlet of the inner housing to the air inlet of the main rotor body for recirculation of the cooled air through the main rotor body.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the disclosure are shown.

These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
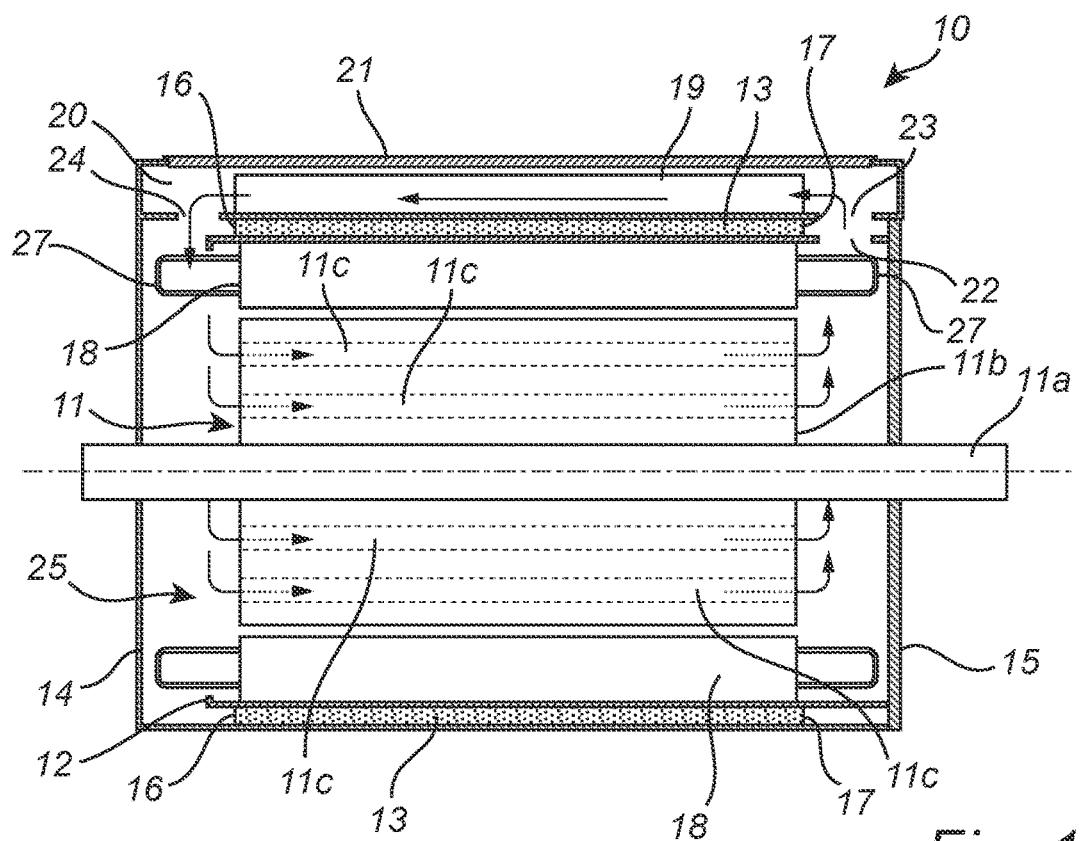
FIG. 1 schematically illustrates a rotor air cooling system in a side sectional view according to an embodiment.

FIG. 1 schematically illustrates a rotor air cooling system 10 in a side sectional view according to an embodiment.

The system 10 includes a rotor 11 contained in an inner housing 12. The inner housing is configured to be inserted into an outer housing 14. A cover 15 attached to the inner housing 12 ensures that the inner housing 12 and the outer housing 14 become enclosed spaces upon the inner housing 12 being inserted into the outer housing 14. The rotor 11 includes a rotor shaft 11a penetrating the inner and outer housing 12, 14 and a main rotor body 11b, commonly referred to as a rotor stack, being encapsulated in the inner housing 12 and surrounding the shaft 11a. The rotor shaft 11a is coupled to the inner housing 12 and the outer housing 14 via rotor bearings. As will be illustrated in more detail in the following, the main rotor body 11b includes axially oriented cavities 11c where air will pass through the main rotor body 11b as it rotates. The direction of the rotor cooling air flow is indicated by means of arrows in FIG. 1.

Hence, air will axially enter the rotor stack 11b in an inlet end, pass through the cavities 11c of the main rotor body 11b, and then exit the main rotor body 11b at an outlet end. In order to avoid the rotor 11 being overheated, the rotor 11 must be cooled, which is typically undertaken using for instance a liquid cooling medium such as oil or water being applied to the rotor as previously discussed.

In this embodiment, a water jacket 13 is arranged in the relatively tight space between the outer housing 14 and the inner housing 12. A first flange 16 and a second flange 17 is arranged to radially protrude from an exterior side of the inner housing 12 and extend around a periphery of the inner housing 12 to abut an interior side of the outer housing 14 (or vice versa), thereby forming a casing surrounding the inner housing 12 where water can be accommodated, thereby creating the water jacket 13. Cold water will thus be applied in the casing formed by the inner housing 12, the outer housing 14 and the two radially protruding flanges 16, 17, thereby forming the water jacket 13 which will cool the inner housing 12.

Fixedly arranged to an interior side of the inner housing 12 is also a stator 18 including stator windings 27.

Further, a heat exchanger 19 may in an embodiment be arranged in an enclosed space 20 at an exterior side of the outer housing 14 for dissipating heat from the heated rotor cooling air having passed through the main rotor body 11b and exiting at its outlet end. The space 20 may be enclosed with a metal plate acting as a lid 21. It may be envisaged that the heat exchanger 19 is integrated with the outer housing 14 as will be illustrated in the following. It is envisaged that the system 10 may include a plurality of heat exchangers utilized to cool air circulating in the system.

A number of configurations are envisaged for the heat exchanger 19; it may be integrated with or attached to the outer housing 14. Alternatively, the heat exchanger 19 may be part of or attached to the inner housing 12 or even arranged externally from the inner and outer housing and connected to the system 10 via closed air channels.

The inner housing 12 includes an air outlet 22 aligned with an air outlet 23 of the outer housing 14 to enable fluid communication between the outlet end of the main rotor body 11b and an inlet of the heat exchanger 19.

As further can be seen, the outer housing 14 includes an air inlet 24 where air will enter into the inner housing 12 from an open backend 25 of the inner housing 12 to enable fluid communication between an outlet end of the heat exchanger 19 and an inlet end of the main rotor body 11b.

Thus, with the created fluid communication between the heat exchanger 19 and the interior of the inner housing 12, the air exiting the main rotor body 11b is radially guided (due to direction of air flow through the system 10) to pass via the respective air outlet 22, 23 of the inner and outer housing 12, 14 through the heat exchanger 19 where heat is dissipated from the air before the air is being radially guided via the air inlet 24 of the outer housing 14 and the open backend 25 of the inner housing 12 to the air inlet of the main rotor body 11b for recirculation of the cooled air through the cavities 11c of the main rotor body 11b.

Again with reference to FIG. 1, to conclude, cooled air axially enters the rotor stack 11b at its inlet end and passes through the cavities 11c of the rotor stack 11b. Hence, this cooled air cools the rotor 11, i.e. the rotor shaft 11a as well as the rotor stack 11b. Further advantageous is that the cooled air entering the inner housing 12 also will cool the stator 18 and its windings 27.

Upon exiting at the outlet end of the rotor stack 11b, the warmed-up air will rise and thus be radially guided in the inner housing 12 towards the air outlets 22, 23 of the inner and outer housing 12, 14 via which the warmed-up air enters the enclosed space 20 and is cooled off by the heat exchanger 19. Further, the cold water of the water jacket 13 surrounding the inner housing 12 will cool the circulated air. it is noted that the water jacket 13 servers as a general cooling element for various components of the system, such as the heat exchanger 19, the stator 18, the rotor 11, etc.

The air being cooled off passing through the heat exchanger 19 will reach an outlet end of the heat exchanger 19 and enter the inner housing 12 in a radial direction via the air inlet 24 of the outer housing 14 and the open backend 25 of the inner housing 12 before again being recirculated through the cavities 11c of the main rotor body 11b in order to advantageously cool the rotor 11 as well as the stator 18 and its windings 27.

Advantageously, an effective rotor cooling system is thus attained using air instead of liquid, such as water or oil. This provides for a more inexpensive and non-complex cooling system 10. Further, the handling is far messier when using liquid instead of air.

Figure 2:
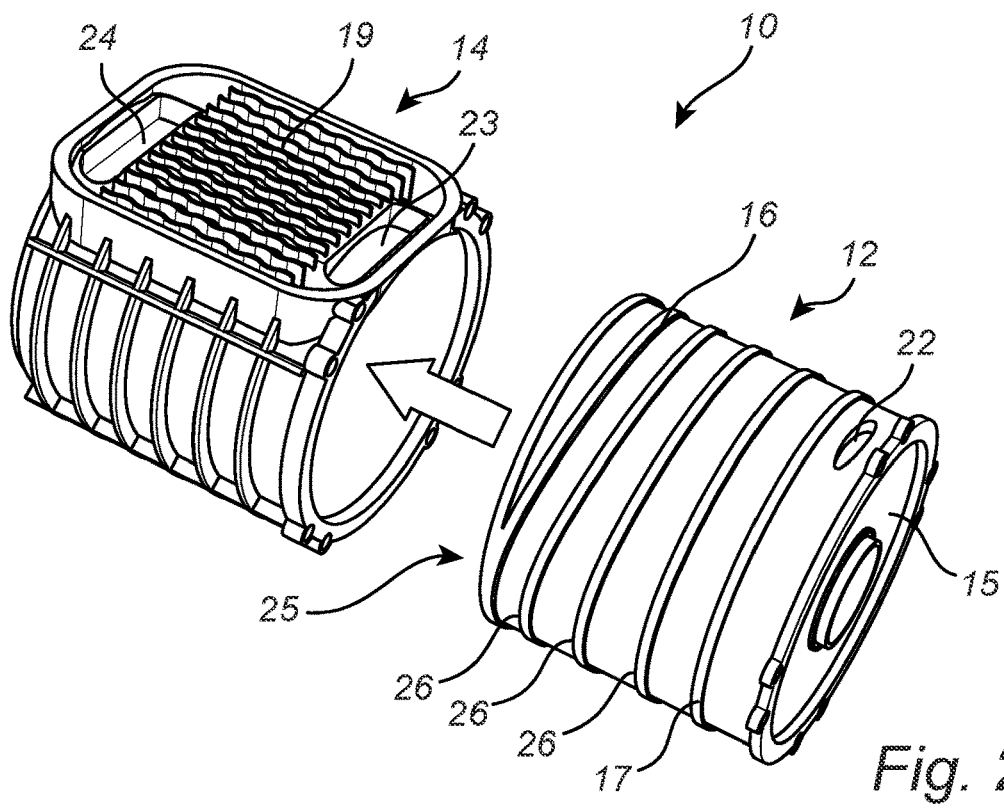
FIG. 2 illustrates a perspective exterior view of the air rotor cooling system according to an embodiment.

FIG. 2 illustrates a perspective exterior view of the air rotor cooling system 10 where for illustrative purposes the inner housing 12 has not been inserted int the outer housing 14.

As can be seen, the inner housing 12 includes an air outlet 22. Further, the first flange 16 and second flange 17 are shown, which protrudes radially from the inner housing 12—more so than the other three flanges—in order to abut the inner surface of the outer housing to create the water jacket (not shown in FIG. 2) upon the inner housing 12 being inserted into the outer housing 14 as indicated with the arrow. The water jacket will extend axially between the first flange 16 and the second flange 17 and typically surround the inner housing 12 when the system 10 is in operation. The three flanges in between the enclosing flanges 16, 17 serves as a spiral-shaped rib 26 extending along a length of the exterior side for guiding the water accommodated in the casing when the inner housing 12 is inserted into the outer housing 14.

When the inner housing 12 is inserted into the outer housing 14, the cover 15 enclosing the inner housing 12 will further close the outer housing 14. Moreover, the air outlet 22 of the inner housing 12 will be aligned with the air outlet 23 of the outer housing 14, while the air inlet 24 of the outer housing 14 will be in fluid communication with the open backend 25 of the inner housing.

In the embodiment shown in FIG. 2, the lid 21 of FIG. 1 has been removed to show the heat exchanger 19 being integrated with the outer housing, though which the rotor cooling air passes from the air inlet 23 to the air outlet 24 and is recirculated in the inner housing 12. During operation, the lid 21 of FIG. 1 is attached to the outer housing 14 to create the enclosed space for the heat exchanger 19. As can be seen, the heat exchanger 19 is in this exemplifying embodiment arranged with wave-shaped cooling fins. However, any appropriate cooling fin shape may be envisaged; such as for instance rectangular fins, offset strip fins, triangular fins, etc.

The cavities 11c extending through the main rotor body 11b from the inlet end to the outlet end, via which the rotor cooling air passes, may extend in an axial direction of the rotor 11, i.e. in parallel with the rotor shaft 11a. However, in an embodiment, the cavities 11c extend slightly helically trough the main rotor body 11b in relation to the rotor shaft 11a.

Figure 3:
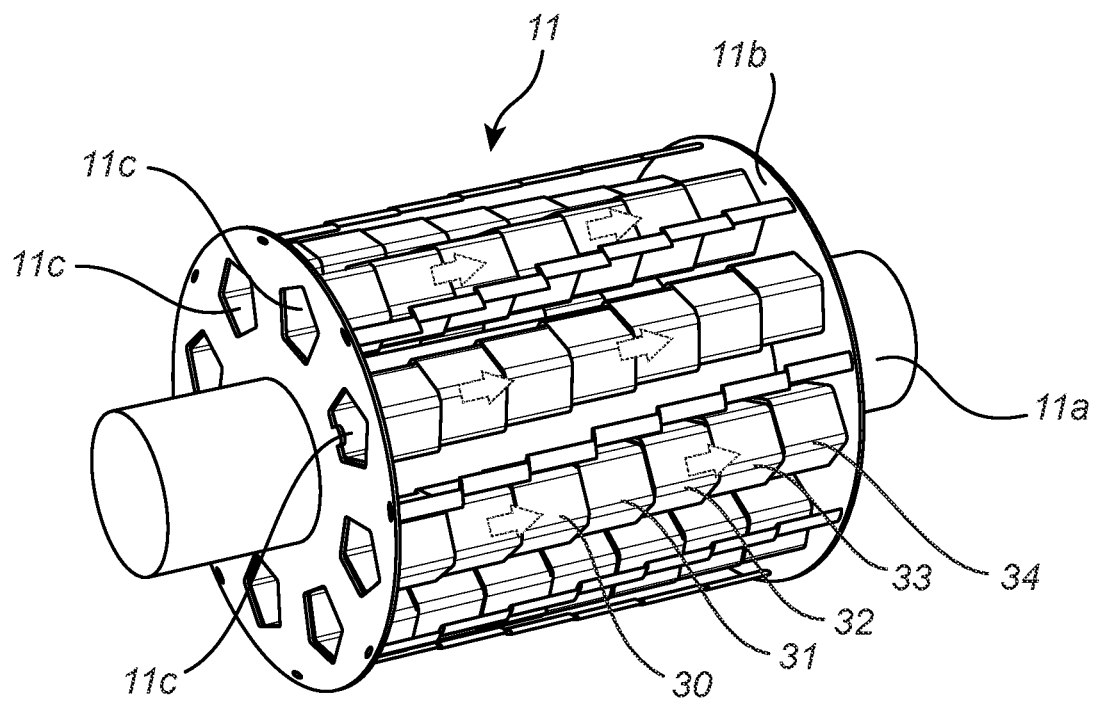
FIG. 3 illustrates a rotor in a perspective view being utilized in the air rotor cooling system according to an embodiment.

FIG. 3 illustrates a rotor 11 in a perspective view according to such an embodiment. Hence, the main rotor body 11b is arranged around the rotor shaft 11a. The main rotor body 11b includes cavities 11c where air will pass through the rotor body 11b from the inlet side to the outlet side as illustrated with arrows. In this embodiment, the cavities 11c are arranged to extend helically from the inlet end of the main rotor body 11b to the outlet end of the main rotor body 11b with respect with respect to the rotor shaft 11a.

In an embodiment, the helix angle of the helically shaped cavities 11c extending through the main rotor body 11b is about 5-10°, such as 6-8°. Advantageously, the helically shaped cavities 11c results in greater air velocities through the main rotor body 11b, and thus a higher air circulation velocity in the system, which effectively improves transfer of heat from the rotor and stator in the system.

Figure 4:
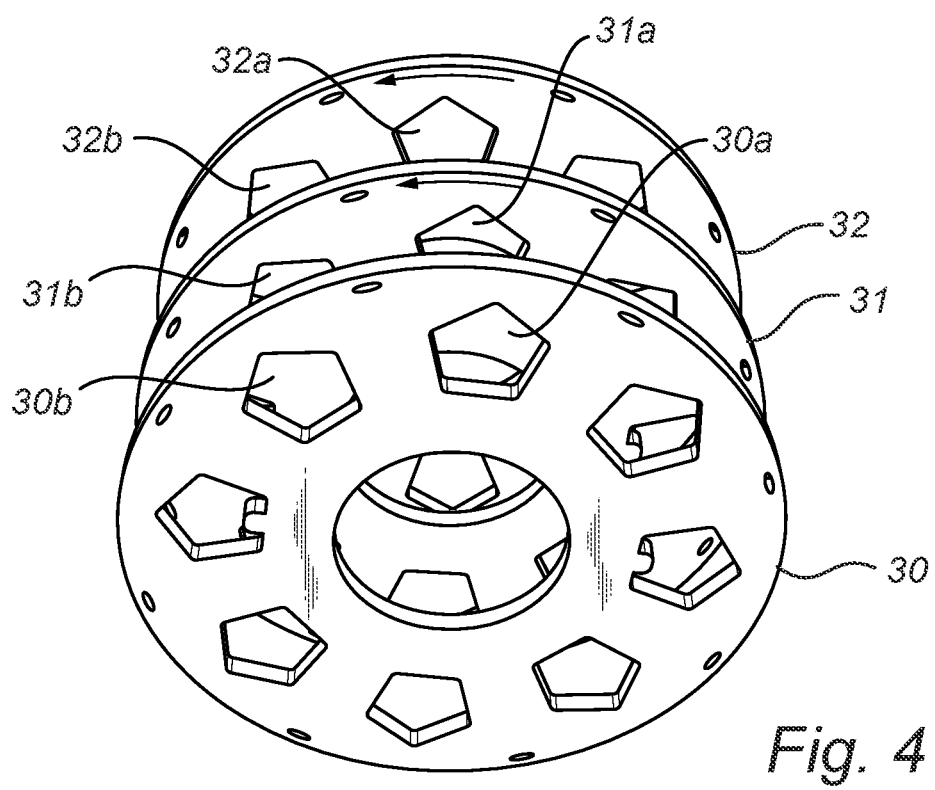
FIG. 4 illustrates a portion of the rotor of FIG. 3.

With reference to FIGS. 3 and FIG. 4, in practice, the main rotor body 11b is formed by individual circular metal discs 30-34 (in practice tens or even hundreds of discs may be utilized depending on the size of the rotor) axially arranged along the rotor shaft 11a and abutting a preceding disc to form the main rotor body 11b, each having through-holes 30a-30b, 31a-31b, 32a-32b distributed around the disc (9 holes in the example of FIGS. 3 and 6 in the example of FIG. 4) where the number of holes correspond to the number of cavities 11c in the main rotor body 11b. The through-holes are illustrated as having pentagonal shape in the FIGs. However, the trough-holes may alternatively be circular, triangular, mushroom-shaped, etc., or have any appropriate shape. Further, any appropriate number of through-holes can be utilized depending on the particular implementation. As is understood, the discs are tightly abutted to form a compact set of discs. The through-holes may further be arranged with cooling fins to increase the heat exchange. This may for instance be attained by arranging inner walls of the through-holes with small tooth-shaped cooling fin members.

The discs 30-34 are thus "stacked" one after another along the rotor shaft 11a, which explains why the main rotor body 11b commonly is referred to as the "rotor stack".

In order to attain axial cavities 11c through the main rotor body 11b, i.e. cavities 11c extending in parallel with the rotor shaft 11a, the discs 30-34 are arranged axially one after another along the rotor shaft 11a to form the main rotor body 11b, the holes of one disc 30 being aligned with the holes of a following disc 31 until all discs have been arranged around the shaft.

However, as shown in the embodiment of FIG. 4, each disc is rotationally offset around the rotor shaft with respect to the preceding disc thereby creating cavities extending helically through the main rotor body.

Thus, after having arranged the first disc 30 around the rotor shaft (the shaft not being shown in FIG. 4), the second disc 31 is arranged around the rotor shaft and slightly rotationally offset with respect to the first disc 30, in this example in a counter-clockwise direction. As a result, the through-holes 31a, 31b of the second disc 31 is rotationally offset with respect to the corresponding through holes 30a, 30b of the preceding first disc 30. Thereafter, the third disc 32 is arranged around the rotor shaft and slightly rotationally offset with respect to the second disc 31 (in the same rotational direction as the previous discs) causing the through-holes 32a, 32b of the third disc 32 to become rotationally offset with respect in relation to the corresponding through holes 31a, 31b of the preceding second disc 31, and so on.

Advantageously, this rotational offset of the discs 30-34 causes the cavities 11c created by the through-holes to extend helically with respect to the rotor shaft 11a.

Figure 5:
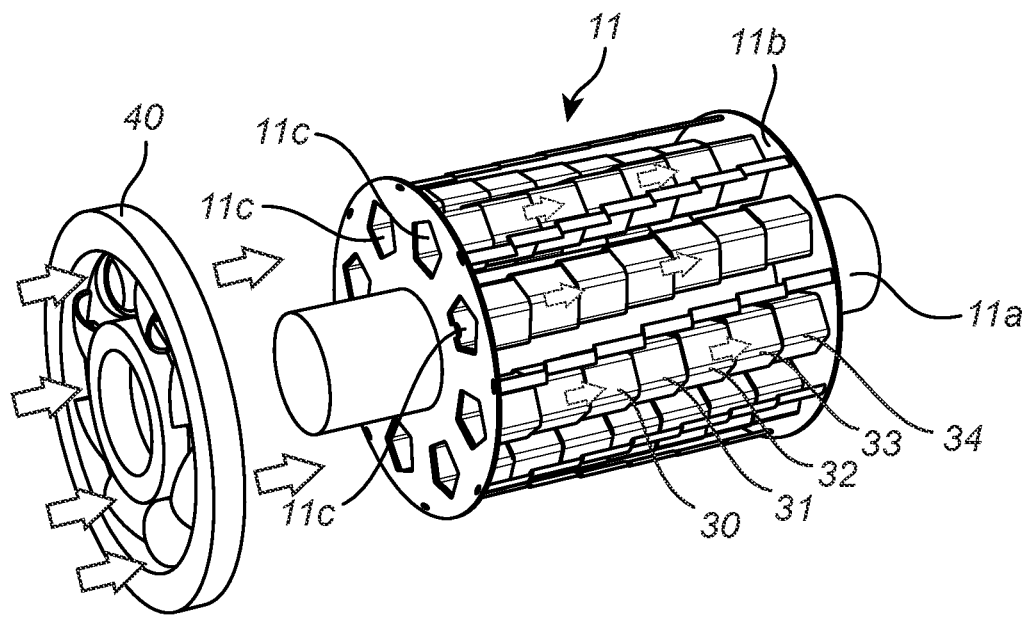
FIG. 5 illustrates the rotor of FIG. 3 being arranged with an axial input endplate according to an embodiment.

FIG. 5 illustrates a further embodiment, where an axial input endplate 40 is arranged around the rotor shaft 11a at the inlet end of the main rotor body 11b. Through-holes of axial input endplate 40 is aligned with the through holes at the inlet end of the main rotor body 11b forming the cavities 11c. Hence, the axial input endplate 40 acts as an axial fan for increasing the flow of cooled air through the main rotor body 11b.

The axial input endplate 40 has at least two advantages; firstly, it is used to balance the discs 30-34 of the main rotor body. That is, it can be pressed against the inlet end of the main rotor body 11b to have the discs 30-34 tightly abut each other along the rotor shaft 11a. Secondly, the axial input endplate 40—being an axial fan—guides the air having been cooled off by the heat exchanger into the main rotor body 11b axially, creating a high pressure zone at the inlet side of the main rotor body 11b, which will push air into the cavities 11c.

Figure 6:
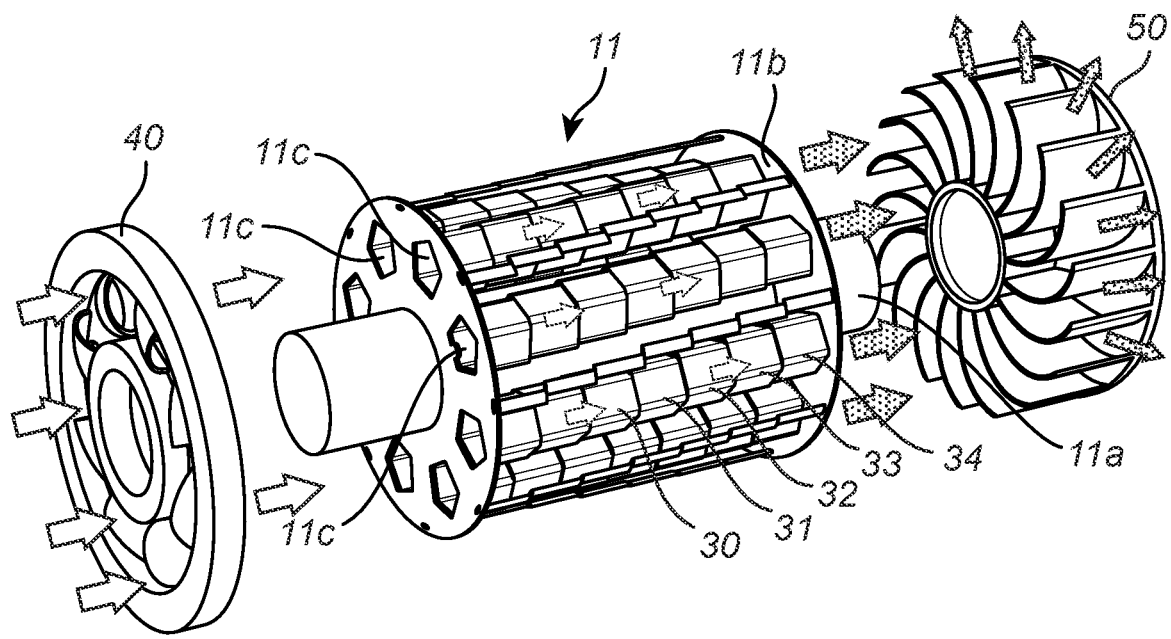
FIG. 6 illustrates the rotor of FIG. 5 further being arranged with an impeller according to an embodiment.

FIG. 6 illustrates a further embodiment, where an impeller 50 is arranged around the rotor shaft 11a at an outlet end of the main rotor body 11b. the blades of the impeller 50 will advantageously facilitate the guiding of the rotor cooling air in a radially direction towards the heat exchanger (not shown in FIG. 5). The impeller 50 distributes the air radially creating a low pressure zone at the outlet side of the main rotor body 11b, which will draw pull air out of the cavities11c. It is noted that the use of the impeller 50 does not require that the axial input endplate 40 also is utilized. Typically, the impeller 50 is in practice arranged around the rotor shaft 11a such that the impeller abuts the outlet end of the main rotor body 11b.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A rotor air cooling system, comprising:
an outer housing;
an inner housing configured to be inserted into the outer housing, the inner housing comprising an open back-end;
a stator attached to an interior side of the inner housing;
a main rotor body comprised in the inner housing, the main rotor body being arranged around a rotor shaft arranged to extend through the inner housing and the outer housing, wherein cooling air axially enters the main rotor body in an inlet end via the open backend of the inner housing, passes through cavities of the main rotor body, and exits the main rotor body in an outlet end;
a water jacket arranged between the inner housing and the outer housing, the water jacket axially extending between a first flange and a second flange formed by and protruding radially from the inner housing to abut an inner surface of the outer housing when the inner housing is inserted into the outer housing, the inner housing comprising one or more spiral-shaped ribs formed by and protruding radially from the inner housing between the first flange and the second flange, the one or more spiral-shaped ribs protruding into the water jacket towards the inner surface of the outer housing less than the first flange and the second flange and not abutting the inner surface of the outer housing when the inner housing is inserted into the outer housing;
a heat exchanger for dissipating heat from the cooling air exiting the main rotor body;
wherein the air exiting the main rotor body is radially guided, via an air outlet of the inner housing being aligned with an air outlet of the outer housing, through the heat exchanger before being arranged to be radially guided via an air inlet of the outer housing being in fluid communication with the open backend of the inner housing to the air inlet of the main rotor body for recirculation of the cooled air through the main rotor body; and one or more of:
- an input endplate arranged around the rotor shaft at the inlet end of the main rotor body, the input endplate comprising through-holes aligned with the through-holes at the inlet end of the main rotor body forming the cavities; and
- an impeller arranged on and around the rotor shaft at an outlet end of the main rotor body to facilitate radial guiding of the cooling air exiting the main rotor body at the outlet end.

2. The rotor air cooling system of claim 1, the heat exchanger being arranged in an enclosed space at an exterior of the outer housing.

3. The rotor air cooling system of claim 2, the outer housing comprising a removable lid configured to open and close the space in which the heat exchanger is arranged.

4. The rotor air cooling system of claim 1, the inner housing comprising a cover arranged to enclose the inner housing and the outer housing upon the inner housing being inserted into the outer housing.

5. The rotor air cooling system of claim 1, the heat exchanger being integrated with the outer housing.

6. The rotor air cooling system of claim 1, said water jacket forming a casing surrounding the inner housing where water can be accommodated.

7. The rotor air cooling system of claim 6, the one or more spiral-shaped ribs guiding the water accommodated in the casing.

8. The rotor air cooling system of claim 1, wherein each cavity of the main rotor body is arranged to extend helically from the inlet end of the main rotor body to the outlet end of the main rotor body with respect with respect to the rotor shaft.

9. The rotor air cooling system of claim 8, wherein the cavities are arranged to have a helix angle of 5-10°.

10. The rotor air cooling system of claim 8, the main rotor body being formed by individual circular discs axially arranged along the rotor shaft and abutting a preceding disc, each disc comprising through-holes distributed around the disc to form the cavities, wherein the through-holes of one disc are arranged to be rotationally offset with respect to the through-holes of the preceding disc, each disc being offset in the same rotational direction, thereby creating the helically extending cavities.

11. The rotor air cooling system of claim 1, the main rotor body being formed by individual circular discs axially arranged along the rotor shaft and abutting a preceding disc, each disc comprising through-holes distributed around the disc to form the cavities, wherein the through-holes of one disc are arranged to be aligned with the through-holes of the preceding disc, thereby creating the axially extending cavities.

12. The rotor air cooling system of claim 1, the input endplate acting as an axial fan configured to increase the flow of cooling air through the main rotor body.

13. An electric motor, comprising:
- a stator;
- a main rotor body; and
- a rotor air cooling system, comprising:
  - an outer housing;
  - an inner housing configured to be inserted into the outer housing, the inner housing comprising an open backend;
  - the stator attached to an interior side of the inner housing;
  - the main rotor body comprised in the inner housing, the main rotor body being arranged around a rotor shaft arranged to extend through the inner housing and the outer housing, wherein cooling air axially enters the main rotor body in an inlet end via the open backend of the inner housing, passes through cavities of the main rotor body, and exits the main rotor body in an outlet end;
  - a water jacket arranged between the inner housing and the outer housing, the water jacket axially extending between a first flange and a second flange formed by and protruding radially from the inner housing to abut an inner surface of the outer housing when the inner housing is inserted into the outer housing, the inner housing comprising one or more spiral-shaped ribs formed by and protruding radially from the inner housing between the first flange and the second flange, the one or more spiral-shaped ribs protruding into the water jacket towards the inner surface of the outer housing less than the first flange and the second flange and not abutting the inner surface of the outer housing when the inner housing is inserted into the outer housing;
  - a heat exchanger for dissipating heat from the cooling air exiting the main rotor body;
  - wherein the air exiting the main rotor body is radially guided, via an air outlet of the inner housing being aligned with an air outlet of the outer housing, through the heat exchanger before being arranged to be radially guided via an air inlet of the outer housing being in fluid communication with the open backend of the inner housing to the air inlet of the main rotor body for recirculation of the cooled air through the main rotor body; and
  - one or more of:
    - an input endplate arranged around the rotor shaft at the inlet end of the main rotor body, the input endplate comprising through-holes aligned with the through-holes at the inlet end of the main rotor body forming the cavities; and
    - an impeller arranged on and around the rotor shaft at an outlet end of the main rotor body to facilitate radial guiding of the cooling air exiting the main rotor body at the outlet end.

14. An electric/hybrid vehicle, comprising:
an electric motor; and
a rotor air cooling system, comprising:
- an outer housing;
- an inner housing configured to be inserted into the outer housing, the inner housing comprising an open backend;
- a stator attached to an interior side of the inner housing;
- a main rotor body comprised in the inner housing, the main rotor body being arranged around a rotor shaft arranged to extend through the inner housing and the outer housing, wherein cooling air axially enters the main rotor body in an inlet end via the open backend of the inner housing, passes through cavities of the main rotor body, and exits the main rotor body in an outlet end;
- a water jacket arranged between the inner housing and the outer housing, the water jacket axially extending between a first flange and a second flange formed by and protruding radially from the inner housing to abut an inner surface of the outer housing when the inner housing is inserted into the outer housing, the inner housing comprising one or more spiral-shaped ribs formed by and protruding radially from the inner housing between the first flange and the second flange, the one or more spiral-shaped ribs protruding into the water jacket towards the inner surface of the outer housing less than the first flange and the second flange and not abutting the inner surface of the outer housing when the inner housing is inserted into the outer housing;

a heat exchanger for dissipating heat from the cooling air exiting the main rotor body;

wherein the air exiting the main rotor body is radially guided, via an air outlet of the inner housing being aligned with an air outlet of the outer housing, through the heat exchanger before being arranged to be radially guided via an air inlet of the outer housing being in fluid communication with the open backend of the inner housing to the air inlet of the main rotor body for recirculation of the cooled air through the main rotor body; and one or more of:
- an input endplate arranged around the rotor shaft at the inlet end of the main rotor body, the input endplate comprising through-holes aligned with the through-holes at the inlet end of the main rotor body forming the cavities; and
- an impeller arranged on and around the rotor shaft at an outlet end of the main rotor body to facilitate radial guiding of the cooling air exiting the main rotor body at the outlet end.

\* \* \* \* \*